(12) United States Patent
Thakkar et al.

(10) Patent No.: US 11,701,910 B1
(45) Date of Patent: Jul. 18, 2023

(54) INKJET PRINTED DOOR AND DOOR COMPONENTS, AND METHODS THEREFOR

(71) Applicant: Masonite Corporation, Tampa, FL (US)

(72) Inventors: Darshit Thakkar, St. Charles, IL (US); Steven B. Swartzmiller, Batavia, IL (US); Steven Gutkowski, Oswego, IL (US)

(73) Assignee: Masonite Corporation, Tampa, FL (US)

( * ) Notice: Subject to any disclaimer, the term of this patent is extended or adjusted under 35 U.S.C. 154(b) by 0 days.

(21) Appl. No.: 17/084,030

(22) Filed: Oct. 29, 2020

Related U.S. Application Data

(60) Provisional application No. 62/927,269, filed on Oct. 29, 2019, provisional application No. 62/927,357, filed on Oct. 29, 2019.

(51) Int. Cl.
| | | |
|---|---|---|
| *B44F 9/02* | (2006.01) | |
| *B44C 5/04* | (2006.01) | |
| *B41M 3/06* | (2006.01) | |
| *B41M 5/00* | (2006.01) | |
| *B05D 5/06* | (2006.01) | |

(52) U.S. Cl.
CPC ............... *B41M 3/06* (2013.01); *B05D 5/061* (2013.01); *B41M 5/0047* (2013.01); *B44C 5/04* (2013.01); *B44F 9/02* (2013.01); *B32B 2260/021* (2013.01); *B32B 2307/402* (2013.01); *B32B 2451/00* (2013.01)

(58) Field of Classification Search
None
See application file for complete search history.

(56) References Cited

U.S. PATENT DOCUMENTS

| | | | |
|---|---|---|---|
| 4,650,694 A | 3/1987 | Dressler et al. | |
| 4,849,768 A | 7/1989 | Graham | |
| 7,001,016 B2 * | 2/2006 | Baxter | B41J 2/01 |
| | | | 347/101 |
| 8,424,264 B2 | 4/2013 | Coghlan et al. | |
| 8,955,281 B2 | 2/2015 | Pietruczynik et al. | |
| 9,079,212 B2 | 7/2015 | Pervan et al. | |
| 10,384,471 B2 | 8/2019 | Pervan et al. | |
| 2007/0110979 A1 * | 5/2007 | Clark | B29C 70/30 |
| | | | 428/292.1 |
| 2015/0322710 A1 * | 11/2015 | Allen | B44C 5/04 |
| | | | 428/156 |
| 2017/0028758 A1 * | 2/2017 | Satou | B41M 7/0081 |
| 2019/0023047 A1 | 1/2019 | Clement | |
| 2019/0345348 A1 | 11/2019 | Pervan et al. | |

FOREIGN PATENT DOCUMENTS

WO  2015118451 A1  8/2015

* cited by examiner

*Primary Examiner* — Laura C Powers
(74) *Attorney, Agent, or Firm* — Calderon, Safran & Cole P.C.

(57) ABSTRACT

The present invention is directed to an article, especially a door and a door component, such as a door facing (or door skin), having a pattern, preferably a woodgrain pattern. This invention also is directed to a method of making the door and the door component such as the door facing (or door skin) by inkjet printing of a pattern on the door facing (or door skin). The printing direction and ink droplets are provided to deliver a high quality image.

20 Claims, 18 Drawing Sheets

(7 of 18 Drawing Sheet(s) Filed in Color)

INKJET PRINTED DOOR AND DOOR COMPONENTS, AND METHODS THEREFOR

CROSS-REFERENCE TO RELATED APPLICATIONS AND CLAIM TO PRIORITY

This application claims the priority of U.S. Provisional Patent Application Nos. 62/927,357 and 62/927,269, both filed Oct. 29, 2019, and are incorporated herein by reference.

FIELD OF THE INVENTION

The present invention is directed to an article, especially a door and a door component, such as a door facing (or door skin), having a woodgrain pattern including woodgrain ticks applied to the article with an ink jet printer. This invention also is directed to a method of making the door and the door component such as the door facing (or door skin) by inkjet printing a woodgrain or other pattern on the door facing (or door skin).

BACKGROUND OF THE INVENTION

Solid, natural wood provides aesthetic qualities that are desirable to many consumers and therefore are preferred for various products. However, solid, natural wood is a relatively expensive material, and thus items made from solid, natural wood are generally more expensive than items made from alternative materials such as plastics or wood composites. As the price of solid, natural wood has increased, the market for manufactured products that simulate solid, natural wood has grown.

The door market is an example of a market in which solid, natural wood has been replaced with simulated wood materials. Hollow core doors simulating solid, natural doors are well known in the art. Such doors typically include a peripheral frame and two door facings (also known in the art and referred to herein as door skins) respectively secured to opposing surfaces of the frame. The frame and door facings surround an interior cavity, which may be hollow or may be filled with a core, for example, corrugated pads, foam insulation, or other core materials, if desired.

The door facings may be formed from a wood composite, such as hardboard, medium density fiberboard, oriented strand-board (OSB), etc. It is also known to form door facings from reinforced polymer materials, such as sheet molding compounds (SMCs) and bulk molding compounds (BMCs) containing, among other things, a thermosetting polymer and reinforcing fiberglass.

It is sometimes desirable to include a woodgrain pattern on the exterior of the door skins to simulate the texture and appearance of solid, natural wood. One way of providing a realistic woodgrain pattern on the exterior surfaces of door skins involves transferring a photographic image of the woodgrain pattern onto a metal embossing or molding plate by a chemical etching process. The chemical consumes selected portions of the surface of the plate to form lower surfaces with raised ridges extending from the lower surfaces. Etching is a process whereby areas of a metal plate are covered with an acid resistant ground, and an acid or mordant solution is applied to the metal plate. Chromed steel, copper, and zinc are three common metals used for embossing plates. The resistant ground, or "resist", controls where and how the acid eats into the metal plate. The areas that are not covered by resist are eaten away by the acid, leaving raised lines or ridges below the resist and the lower surfaces between the ridges. The resist is then removed. The ridges create the illusion of a woodgrain, including woodgrain ticks.

The etched plate may be used as an embossing plate or with a mold die set for embossing or molding a substrate to produce an article having an inverse of the plate's pattern on its exterior surface. In the case of molding, the substrate is subjected to selected amounts of heat, pressure, and time to form the molded article. When embossing a substrate to form a door skin having a woodgrain pattern, the embossing plate is pressed into the substrate material to provide the appearance of bundles of woodgrain and woodgrain ticks that form the grain pattern in the resulting door skin exterior surface. A woodgrain pattern may include a cluster or bundle of spaced lines or "ticks", which extend in a pattern simulating the appearance of natural wood. The ticks must be carefully spaced to simulate a natural woodgrain tick pattern. The exterior surface may then be stained, for example, by wiping or brushing the stain on the exterior surface, to provide a stained, visible woodgrain tick pattern.

The molding and embossing of woodgrain texture on the exterior surfaces of door facings is described in several patents owned by Applicant, including, for example, U.S. Pat. Nos. 10,047,556, 9,976,339, and 9,744,801.

Other times, it is desirable to provide door skins with a smooth surface that does not simulate the appearance of natural wood. Smooth-surface door skins are typically coated with one or more layers of paint or other coating. An example of a smooth surface appearance is that of a painted steel plate. To provide the smooth surfaces, woodgrain tick patterns are not molded, embossed, or otherwise formed in the exterior surfaces of door skins. Rather, the door skins are typically subject to compression pressing using mold dies or plates with non-textured mold surfaces.

Ultimately, the choice between a door with woodgrain texture or a door with a smooth surface is a decision made by the consumer or builder. Consumer and builder preferences vary. However, once the decision is made, consumers and builders (and remodelers hired by consumers) expect the door to be available for delivery in short timeframe. Therefore, manufacturers typically stock large inventories of both woodgrain-textured and non-textured door skins to meet demand. Moreover, the manufacturer of the door skins may also manufacture door skins that simulate different wood species, and thus needs to stock a large number of doors in order to be able to supply not just the species selected but also the appropriate door sizes. Because consumer and builder preferences are difficult to predict, it may be necessary to provide large excess stocks of both woodgrain-textured and non-textured door skins to meet short turn-around time demands. Given that doors come in a variety of different designs (such as different numbers and shapes of panels, the presence or absence of a lite, different shaped ovalos or profiles, etc.) and numerous sizes, maintaining excess inventories of both woodgrain-textured and non-textured door skins can require large storage warehouses and lead to waste if inventory predictions do not match actual demand. Furthermore, substantial amounts of capital are tied up in manufacturing and stocking all of the associated doors and door skins, thus increasing the cost of the resulting doors.

Other way of providing a realistic woodgrain tick pattern in the exterior surfaces of a substrate involves inkjet printing the woodgrain pattern onto the door skins/doors and door components. Current inkjet printers do not have the ability to print accurately in recessed or variable depth areas with acceptable print quality for high-end door systems. The disclosed invention is directed to inkjet printed fiberglass and/or molded hardboard door systems (doors and door components—jambs, lite frames, side-lite, SDL's, etc.) having a woodgrain image with ticks for door designs comprising panels, both recessed and raised.

The current inkjet printers available in the market do not have the ability to accurately and adequately print in the recessed area/variable product depth with acceptable print quality, particularly wood ticks which are relatively small. Existing printers and their respective protocols (equipment, process, materials, etc.) do not have the ability to print on a door facing or skin with a recessed area i.e. shaker style panels where the printing needs to be done on flush (non-recessed) area as well as panels (recessed area), with the associated ovalo. Many door designs require printing in the recessed areas so that a realistic natural-appearing woodgrain and associated ticks extend over the entirety of the door skin exterior (visible) surface.

Thus, improvements that enhance image quality of an inkjet printing of a woodgrain and tick pattern on a door skin are possible.

SUMMARY OF THE INVENTION

An aspect of the invention is a door component, such as a door skin or door jamb, having an inkjet printed image, such as a woodgrain and associated tick image. The image is printed in the direction of the woodgrain by depositing ink droplets onto the door skin through use of an inkjet printer, the ink droplets being applied in a direction extending in the woodgrain/tick direction. The ink droplets provide a high quality image, even when the distance between the printer head and the surface of the substrate is between 2 mm to about 14 mm.

Another aspect of the invention is a method for inkjet printing an image, such as a woodgrain and tick image, on a substrate, such as a door skin or door jamb. The method includes printing the image on the door skin in a preferred direction corresponding to the direction or orientation of the woodgrain/ticks and with an ink drop size sufficient to provide a high quality image.

Other methods and applications for different aspects of the present invention are also provided.

Other aspects of the invention, including apparatus, devices, kits, processes, and the like which constitute part of the invention, will become more apparent upon reading the following detailed description of the exemplary embodiments.

BRIEF DESCRIPTION OF THE DRAWINGS

The patent or application file contains at least one drawing executed in color. Copies of this patent or patent application publication with color drawings(s) will be provided by the Office upon request and payment of the necessary fee. The accompanying drawings are incorporated in and constitute a part of the specification. The drawings, together with the general description given above and the detailed description of the exemplary embodiments and methods given below, serve to explain the principles of the invention. In such drawings.

DETAILED DESCRIPTION OF EXEMPLARY EMBODIMENTS

Figure 1:
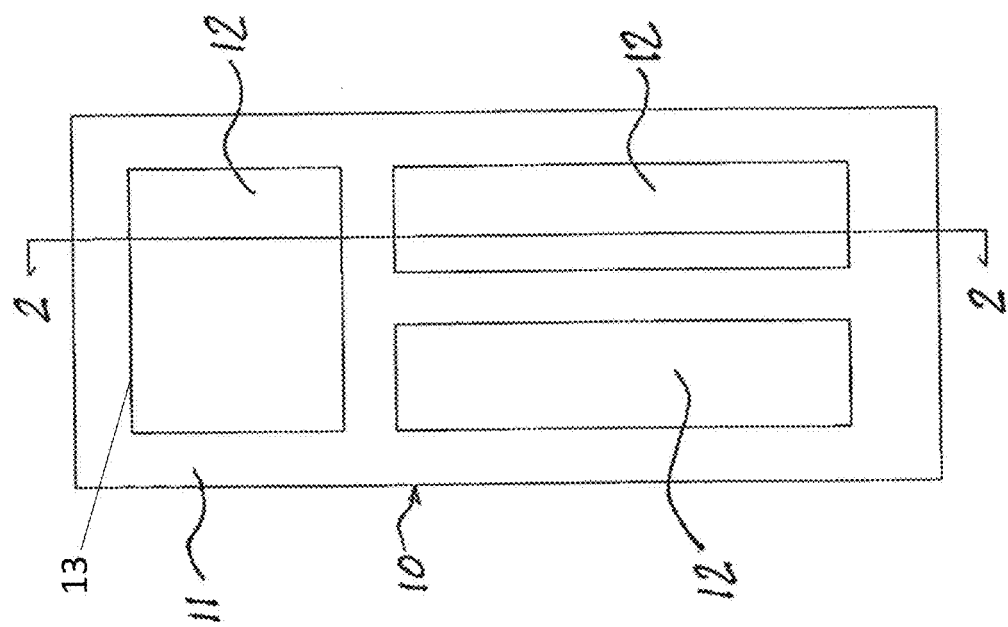
FIG. 1 is a front view of a door skin with recessed panels.

Reference will now be made in detail to the exemplary embodiments and exemplary methods as illustrated in the accompanying drawings, in which like reference characters designate like or corresponding parts throughout the drawings. It should be noted, however, that the invention in its broader aspects is not necessarily limited to the specific details, representative materials and methods, and illustrative examples shown and described in connection with the exemplary embodiments and exemplary methods.

This description of exemplary embodiments is intended to be read in connection with the accompanying drawings, which are to be considered part of the entire written description. In the description, relative terms such as "horizontal," "vertical," "front," "rear," "upper", "lower", "top" and "bottom" as well as derivatives thereof (e.g., "horizontally," "downwardly," "upwardly," etc.) should be construed to refer to the orientation as then described or as shown in the drawing figure under discussion and to the orientation relative to a vehicle body. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" as used in the claims means "at least one".

Exemplary embodiments of the present invention are directed to a door component, such as a door skin (or door facing) or door jamb, and related methods of making and using the door component having one or more exterior surfaces including images configured to collectively simulate the appearance of a woodgrain pattern, including woodgrain ticks. As used herein, the term "woodgrain" includes any pattern resembling natural appearing wood woodgrain, preferably of any type of wood. Woodgrain tick patterns are a series of corresponding lines simulating wood ticks as found in natural wood, and may include width and length variations. Wood ticks are relatively small, on the order of a length of 1 cm and a width of 0.1 cm. Ticks may be arrayed close to one another extending in the same general direction in order to form the resulting woodgrain pattern. Woodgrain ticks vary in size and number, from being relatively fine such as with cherry woodgrain and relatively large and numerous as with oak woodgrain. The term "pattern" can be a repeating design or non-repeating design, including natural woodgrain tick designs, unless otherwise expressly indicated. The woodgrain pattern includes cluster or bundle of spaced ticks 25 (see FIG. 3), which extend in a pattern simulating the appearance of natural wood. The ticks must be carefully spaced to simulate a natural wood grain. The direction parallel to the length of the ticks defines the direction of the woodgrain and the ticks.

The door skin is typically molded from a composite material and has a thickness of, for example, about 0.13 mm (0.05 inches) to about 52 mm (0.20 inches), depending on the door application and the skin material selected. The selected material of the door skin can be a sheet molding compound or "SMC". Generally, SMCs include, for example, about 15 to about 30 weight percent of a thermosetting resin composition, about 3 to about 20 weight percent of one or more low profile additive, about 10 to about 30 weight percent reinforcement, typically fiberglass, and other ingredients, such as filler, fire retardants, mold release agents, shelf inhibitors, wetting agents, homogenizers, UV retardants, pigments, thickening agents, antioxidants, antistatic metals, colorants, and/or other additives. Concentrations may be adjusted as warranted for obtaining desired properties. The above SMC composition is provided by way of example and is not limiting. Other natural or synthetic materials that may be selected for the door skins include bulk molding compounds (BMCs), medium density fiberboard, high density fiberboard, reinforced thermoplastics (e.g., polypropylene, polystyrene), and metals such as steel.

Any suitable molding technique may be employed for making the door skin, including, for example, compression molding, resin transfer molding, injection compression molding, thermoforming, etc. Generally, compression molding involves introducing the SMC onto a lower die, then moving one or both dies towards the lower die to press the SMC under application of heat and pressure in order to conform the SMC to the contour of the die surfaces defining the closed mold cavity. Sheet molding compounds are often pressed within a temperature range of, for example, about 135° C. (275° F.) to about 177° C. (350° F.). The dies exert a pressure on the composition of, for example, about 1000 to about 2000 psi. The pressing operation often lasts, for example, about 30 seconds to 2 minutes. A method for making a SMC door skin is disclosed in U.S. Pat. Pub. No. 2013/0199694. The procedures and parameters herein provided are by way of example, and are not limiting.

Figure 2:
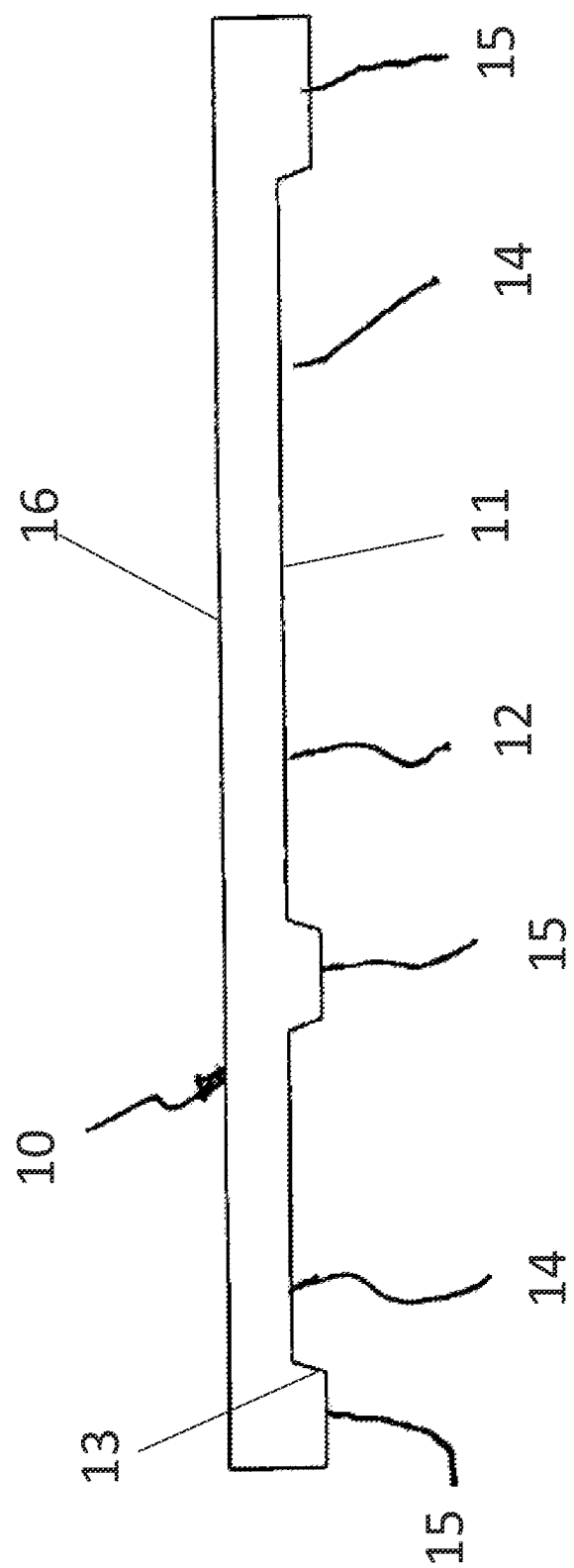
FIG. 2 is a cross-sectional view of the door skin taken along the lines 2-2 in FIG. 1.

The skin 10 of FIG. 1 has an exterior surface 11 including contours, such as a contoured portion, sometimes called an ovalo, surrounding and defining an inner molded panel 12, as best shown in FIG. 1. The inner molded panel(s) 12 may be coplanar with, recessed from, or elevated relative to the planes in which the exterior surfaces principally extend. As illustrated in FIGS. 1-2, the panel(s) 12 includes a recessed area (or surface) 14 and a flush (or non-recessed) area (or surface) 15, as best shown in FIGS. 1 and 2. The stiles and rails of the door facing 10 are interconnected to the panels 12 by a recessed contoured area known as the ovalo 13. While the ovalo 13 is illustrated as linear, those skilled in the art recognize that it frequently is curvilinear, such as in a bead and cove style. Thus, the stiles/rails lie on a first plane 15 and the panel surfaces 14 lie on a second plane 14 that is spaced from the first plane. The height difference between the first and second planes may be 9 mm or more. The exterior surface 11 may be smooth or molded/embossed to simulate a design or pattern, such as a wood grain design. The door skin 10 also includes an interior surface 16 (FIG. 2) opposing the outer surface 11 for securing to a frame to form door. Preferably, an image/pattern is printed on the exterior surface 11 of the door skin, preferably to provide a wood grain design.

Although doors, door skins, or other door components are disclosed herein, a skilled person would understand that the invention is also directed to other substrate surfaces where inkjet printing is desired, including, but not limited to, sheet molding compound, steel, wood composites, fiberglass, or combinations thereof.

Because currently available inkjet printers are not configured to print a sharp image on to the surface of the door component due to the long and varying distance between the print head and the door component, the present invention provides door components and methods for printing onto the components, particularly for printing a wood grain pattern onto the door component. Applicant has developed a printing method that provides a sharp pattern, preferably accurately replicating a naturally appearing woodgrain and tick pattern, on the door component by controlling the printing direction, ink drop size, and ink drop velocity.

For a nominal distance printing, i.e. 1 to 2 mm, from the printhead to the substrate, key variables taken into consideration are the waveform applied to the inkjet nozzles to excite them, velocity of the ink, the temperature of the ink, rheology of the ink and the consistency, voltage, and frequency applied to the printhead to control the drop size, velocity, and other variables. Increasing the distance between the substrate and the printhead increases the time for the droplets to travel from the printhead nozzle to the project target on the substrate. This, in turn, requires sufficient velocity to travel the increased distance in the amount of time as the substrate to passes below the printer. Having variable distances between the print head and the substrate requires optimized drop size (volume) and velocity of the droplet to compensates for the changes in the distances and landing on the targeted position on the substrate.

Figure 3:
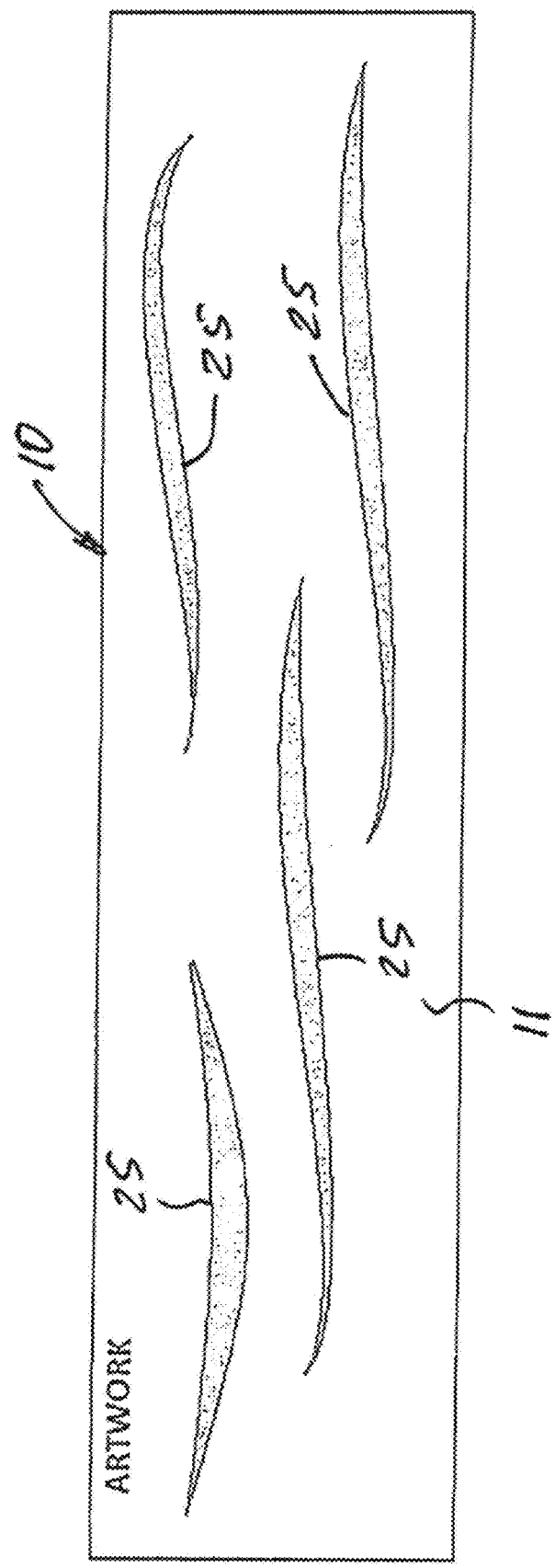
FIG. 3 shows an example of the ticks of a woodgrain extending in one direction.

The present invention is related to a method for inkjet printing of a woodgrain and tick pattern, such as illustrated in FIG. 3, on a door facing (or door skin) generally denoted by reference numeral 10. The door skin 10 includes one or more panels 12, which may be recessed from the plane of the stiles/rails or which may be coplanar with the stiles/rails. Regardless of the panel 12 configuration (recessed or coplanar), an ovalo 13 connects the panel surface 14 with the surrounding stile/rail to form a one-piece door skin 10.

Thus, the door skin 10 has an outer surface 11 including a recessed area (or surface) 14 and a flush (or non-recessed) area (or surface) 15, as best shown in FIGS. 1 and 2. The stiles and rails of the door facing 10 are interconnected to the panels 12 by a recessed contoured area known as the ovalo. Thus, the stiles/rails lie on a first plane and the panels lie on a second plane that is spaced from the first plane. The height difference between the first and second planes may be 9 mm or more. The door skin 10 according to an exemplary embodiment of the present invention is made of a sheet molding compound (or sheet molding composite) (SMC) coated with a basecoat. The SMC is fiberglass-based compression molding. The woodgrain pattern includes a plurality of ticks 25 extending lengthwise in the direction of the woodgrain, as illustrated in FIG. 3. While we disclose use of SMC for forming the door facing 10, those skilled in the art will understand that the invention may be practiced with door facings made of steel and of molded wood composites.

Figure 6:
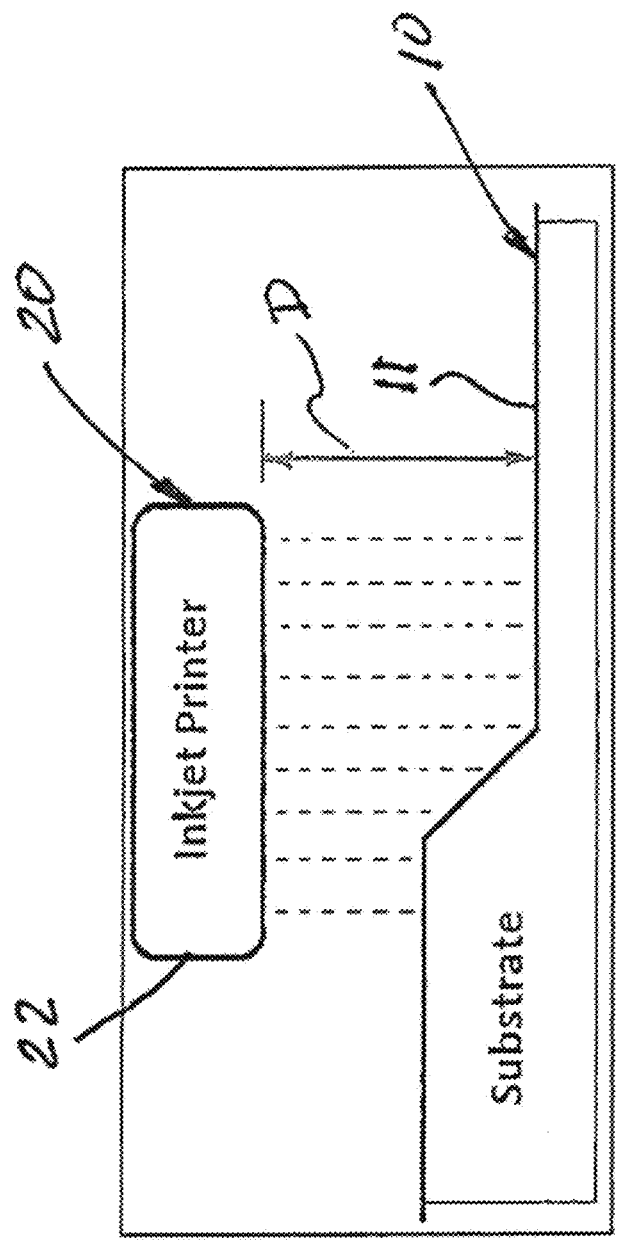
FIG. 6 shows printing on the door skin by an inkjet printer.

A drop-on-demand (DOD) inkjet printer 20 prints inks onto a substrate, e.g. the outer surface 11 of the door skin 10, as shown in the FIG. 6. A waveform controls printhead 22 so as to eject drops of ink at a specified volume and velocity from the print nozzles of the printhead 22. The printhead 22 has a plurality of nozzles for ejecting ink based upon the waveform. The nozzles are each associated with a particular color and the nozzles are selectively actuated in order to eject ink of the proper colors and amounts in order to create the desired color and image. The inkjet nozzles typically each eject ink of a single color, with there being as many as four and sometimes six colors that are selectively ejected to create an image and its associated colors. Cyan, magenta, white, and black were colors utilized in inkjet printing during development (See FIGS. 15A, 15B). Cyan, magenta, yellow, white and black are colors often utilized in inkjet printing implemented according to the invention, although other color combination and/or numbers of colors may be utilized.

The door skin 10 moves relative to the printhead 22 at a specified speed, preferably about 1 m/minute to about 20 m/minute. We prefer that the door skin 10 moves underneath printhead 22 in order to maximize stability of the printhead 22 because it may be structurally supported and thus fixed in position. The printhead extends across the width of the door skin 10. The printhead is fixed in position in order to allow the nozzles to be maintained at a known location. Preferably there are a plurality of printheads 22 extending across the door skin 10, each print head 22 containing a plurality of the inkjet nozzles. A preferred inkjet printer is available from Grouppo TechnoFerrari, Model Vivajet Single Pass Printer. The inks deposited on the door skin 10 are cured at fixed positions, or dots, on the door skin 10, preferably with UV light. As shown in the FIG. 6, the outer surface 11 of the door skin 10 exhibits features that define variable printing distances relative to the printhead 22. The process protocol described here is chosen to provide high quality images at any of the features/distances of the substrate 10.

Figure 18:
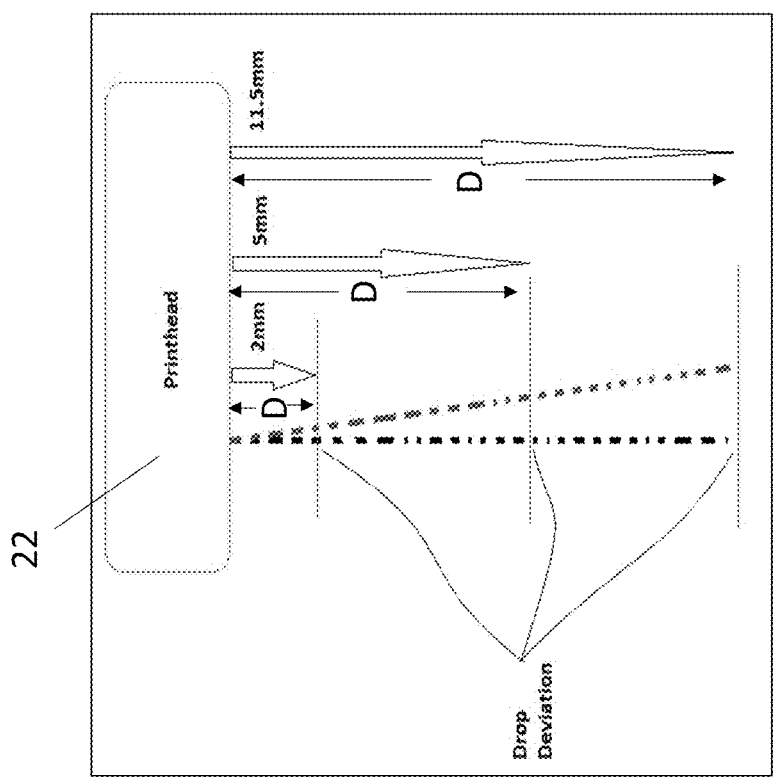
FIG. 18 shows positional deviation of ink drops at different printing distances D.

Print orientation plays an important role in achieving high print quality. The printing distance D between the printhead 22 and the outer surface 11 of the door skin 10 defines how a printed image is going to look with a high image quality. The greater the printing distance D, the higher the likelihood that the ink drop will deviate from its intended position (see FIG. 18). As best shown in FIG. 18, at the same angular deviation, the position of an ink drop will deviate significantly (from its intended position) as the printing distance D increases, particularly when the printing distance D is greater than 2 mm. The positional deviation causes a low quality and blurry image. The same is also true of drop size. A smaller the drop size allows for sharper image quality, while a larger drop size results in a more pixelated image. The larger drop size, however, due to its increased mass, is less likely to deviate from its intended position after being ejected from the print head. According to the present invention, lines or the woodgrains ticks 25 on the door skin 10 are inkjet printed in a direction of the woodgrain/ticks 25 (or in the direction parallel to the woodgrain/ticks 25), or other printed pattern having longitudinal design elements aligned with the print direction.

Figure 4:
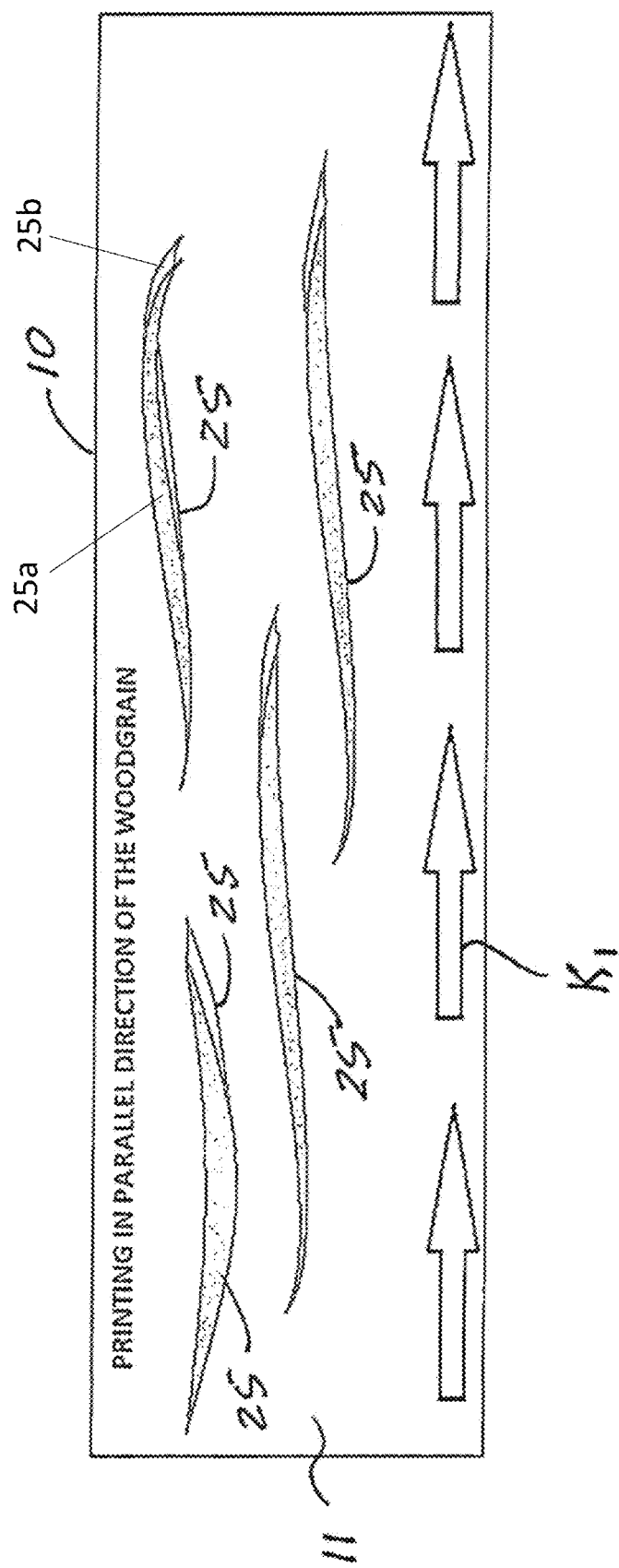
FIG. 4 shows the ticks of the woodgrain image printed on a door skin in a direction of the woodgrain according to a present invention.
Figure 5:
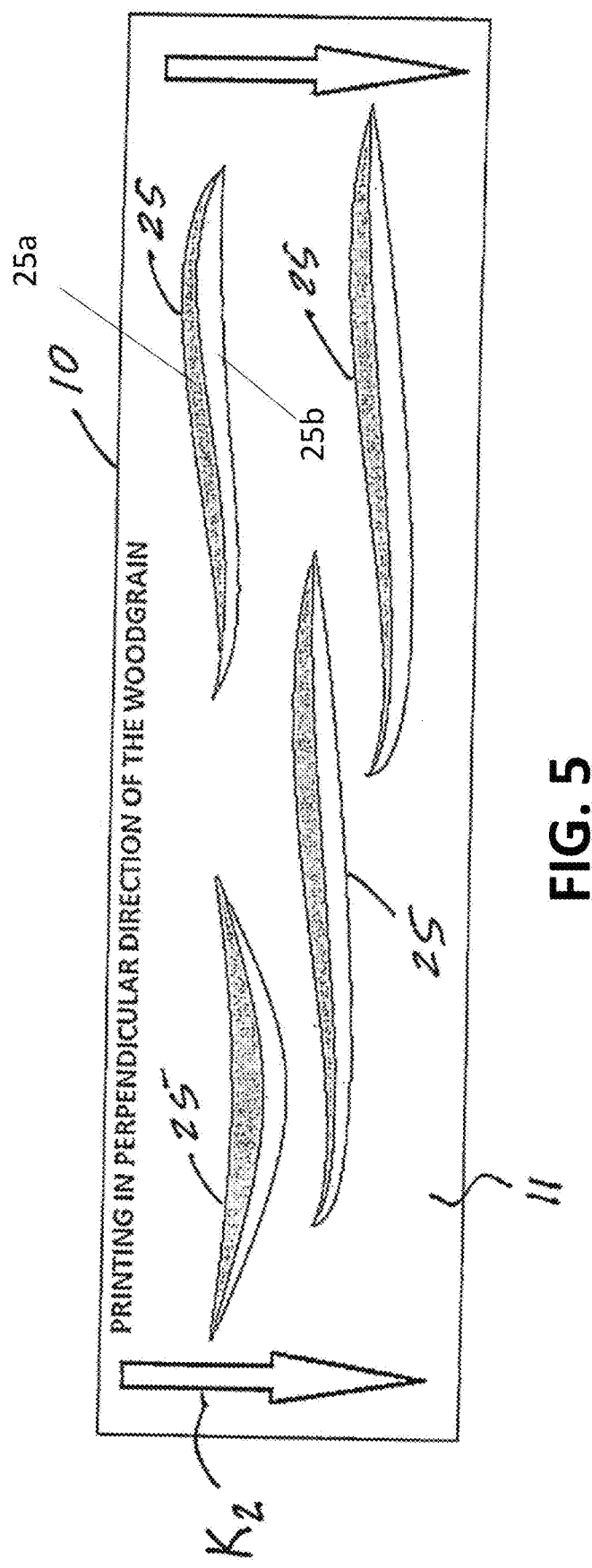
FIG. 5 shows the ticks of the woodgrain printed on the door skin in the direction perpendicular to the woodgrain direction.

As illustrated in FIG. 4, and denoted by reference character $K_1$ ($K_1$ indicates the direction of printing that is parallel to the direction of the woodgrain), the disclosed printing method (i.e., printing in the direction of the woodgrain/ticks) gives significantly higher print quality compared to inkjet printing the line/woodgrain 25 in the direction perpendicular to the lines or the woodgrains/ticks 25, as illustrated in FIG. 5 and denoted by reference character $K_2$ ($K_2$ indicates the direction of printing that is perpendicular to the direction of the woodgrain). Woodgrain ticks tends to be oriented in a dominant direction, sometimes through orientation of "cathedrals" (such as with oak) where the peaks of the cathedrals are oriented generally in one orientation with the associated lines of ticks 25 extending generally in that orientation and sometimes due to the wood ticks 25 extending in one generally parallel alignment (such as with cherry). Moreover, inkjet printing in the parallel direction over long distances helps preserve the image quality.

We have found that for the same printing distance, printing in the perpendicular direction $K_2$ drastically reduces the image quality. Specifically, as illustrated in FIG. 4, excess ink-drops/deviated ink-drops in the direction $K_1$ of woodgrain 25 affects (i.e., induces) minimal drop in the print quality according to the exemplary embodiment of the present invention. The excess ink-drops/deviated ink-drops 25b in the direction $K_2$ perpendicular to the woodgrain 25 affects (i.e., induces) maximum drop in the print quality, as illustrated in FIG. 5.

Figure 10:
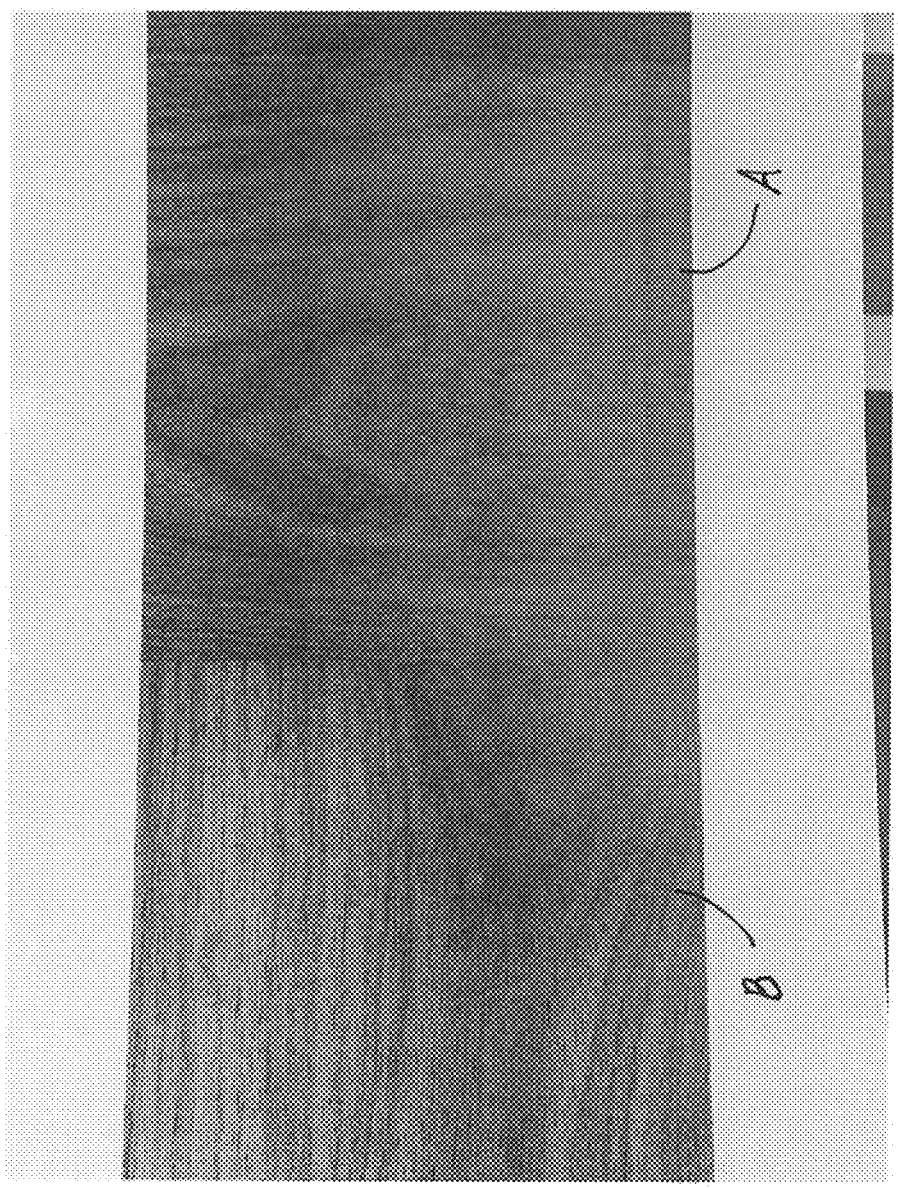
FIG. 10 shows images of printing in the woodgrain direction (B) and in a direction perpendicular to the woodgrain (A)

Image quality drops when printing in the perpendicular direction $K_2$ for any number of reasons, including difficulty in reaching contoured portions of the ovalo, ink droplets being off target due to nozzle clogging, ink droplets being off target due to air currents attributable to ejecting the droplets causing the droplets to move off target, nozzles being improperly aligned, etc. The ink droplets occupy a volume and thus displace that volume when ejected into the space between the printhead and the substrate 11. The droplets are ejected at a high rate, such that air currents are created that may tend to move droplets off target. The tick grain direction typically is in the lengthwise direction of the door facing 10, so the ovalo may be accurately accessed and a clogged or misaligned nozzle will still be targeted in the general direction where the ink is desired. Wood ticks frequently have a very fine appearance, so even a small distortion due to off-target droplets in the perpendicular direction is more visually apparent than one that is off target in the wood grain direction. FIG. 10 shows printing of woodgrain patterns in the parallel direction (in the direction of the woodgrain) (B) and in the perpendicular direction (A) using the same printer. It is clear that printing in the direction of the woodgrain (B) creates a much better image quality than in the perpendicular direction.

Without being bound to any particular theory, it is believed that for a given printing deviation, as shown in FIG. 18, printing in the direction of the wood grain/tick direction minimizes misprint zones in the image. For example, FIGS.

4-5 show ticks 25 being printed in the direction of the woodgrain $K_1$ and in a perpendicular direction, respectively. Each tick is formed by a zone 25a where the ink drops are deposited in their proper position, and a misprint zone 25b where the ink drops deviate from their intended position. Comparing FIGS. 4-5 shows that the misprint zone 25b is smaller when the print direction is in the direction of the woodgrain $K_1$. The smaller misprint zone 25b results in a sharper, better quality image.

FIG. 18 illustrates the possible magnitude of a drop being off target for various distances. It is preferred that the nozzles of the printhead 22 be oriented vertically so that the droplets move only vertically. Some nozzles invariably are not oriented vertically, so that the ink droplets are angled relative to the vertical. It can be seen from FIG. 18 that the magnitude of the deviation from vertical increases as the distance D of the substrate from the printhead 22 increases. The deviation may be so large that a misdirected/deviated droplet may land where another properly aligned nozzle is targeted, with the result that the target of the properly aligned nozzle receives two drops and not one. Considering the small size of the ticks, a 0.01 cm deviation of a drop in the length direction of the tick may not be significant whereas a 0.01 cm deviation in the width direction may be significant and adversely affect image quality. Printing in the woodgrain/tick direction thus minimizes the significance of misaligned/clogged nozzles.

For existing printers, an optimal printing distance between the printhead 22 and the outer surface 11 of the door skin 10 (i.e., the substrate) only ranges about 2 mm to about 3 mm. The print quality drops at greater printing distance, e.g. 11.5 mm and more. In actual practice, the distance between the printhead and the outer surface 11 of the door skin 10 ranges from about 2 mm to about 14 mm. Thus, the printhead 22 must be able to deliver a high-quality image onto the door facing 10 where the distance between the printhead 22 and the surface to be printed on the door facing 10 varies from about 2 mm to about 14 mm. Those distances are generally too long for existing printers and conventional printing techniques.

Those skilled in the art recognize that ejection of ink from printhead 22 causes the air in the space between the printhead 22 and the surface to be removed or displaced due to the interposition of the ink droplet. The ink droplets must be targeted at the point where the ink is to be applied, and must have sufficient momentum to reach the maximum print depth without becoming directed off target by air currents created by the air being displaced by the ink droplets. A high-quality print image requires precise control over ink droplet size, targeting, and delivery.

Figure 11:
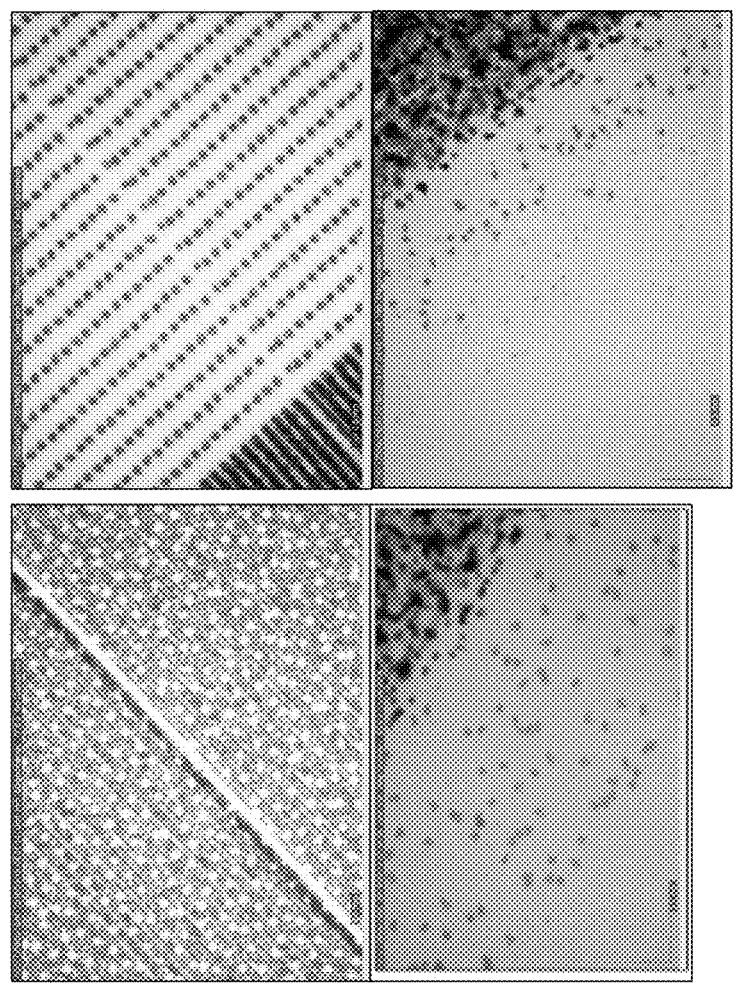
FIG. 11 shows printed images containing ink drops which deviate from their targeted print locations.
Figure 12:
FIG. 12 shows a printed image with ink drop deviations for the magenta color resulting in image blurriness with a reddish look.

In order to obtain a better image quality at long distance printing, ink drop size needs to be in a range sufficient to assure the droplet has sufficient momentum that it does not deviate from the intended print position. The droplet size should also avoid producing a pixelated image. Sufficient ink drop velocity and size provide improved and optimal image quality at variable distance D, e.g., from 1 mm to 14 mm, between the substrate (e.g., a door skin) and the printhead 22. If the drop size is too small, the ink drops can deviate from their intended positions while traveling the long distance between the print head and the substrate (see FIGS. 11 and 12). The increased distance D creates turbulence with the small drops or the mist/satellites created by the ink. Thus, the smaller the drop size, the higher the chance for it to deform, creating more turbulence that can affect the drop landing precision of the ink. This lowers the image quality, resulting in a fuzzy image.

Figure 13:
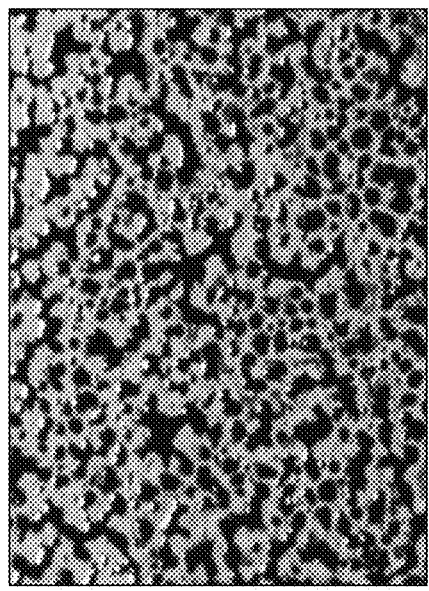
FIG. 13 shows a printed image containing ink reticulation.
Figure 14:
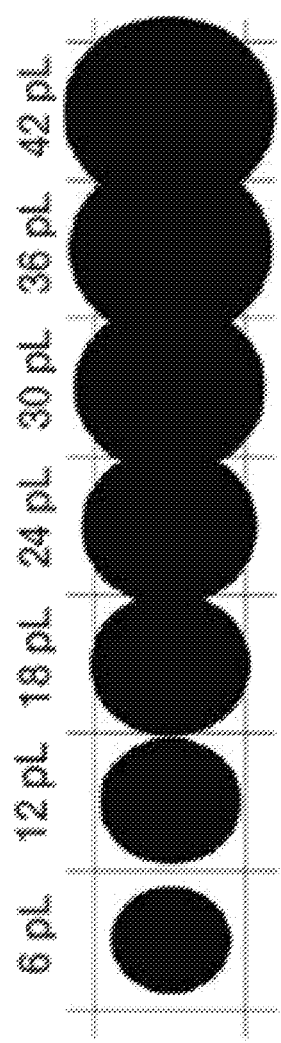
FIG. 14 shows relative drop sizes between 6 picoliters and 42 picoliters respectively from left to right for a XAAR 1003 GS6 printhead.

On the other hand, having a larger drop size eliminates the drop deviation at long distance, but may result in a spotty/pixelated image quality. Larger drop sizes can also lead to ink reticulation or splatter, resulting in a poor quality image (see FIG. 13). Controlling the rheology of the ink, ink exit speed, drop size, and other variables, achieves a better print quality image. The minimum drop size for 1-14 mm printhead to substrate distances D that achieved acceptable image quality is about 18 picoliters to 24 picoliters. XAAR 1003 GS6U printheads (XAAR, Cambridge, UK) and XAAR 1003 GS12U printheads are exemplary printheads, respectively. A GS6 printhead can produce drops between 6 to 42 picoliters; and a GS12 printhead can produce drops between 12 picoliters to 84 picoliters. Thus, for a GS6 printhead, the drop size of about 18 picoliters to about 42 picoliters can be ejected as required; and for a GS12 printhead, the drop size of about 24 picoliters to about 84 picoliters can be ejected as required. FIG. 14 shows the relative sizes of drop sizes for drops of 6 picoliters to 42 picoliters. Preferably, for each print head, the exciting waveform produces optimal drop size for printing on the substrate at distances D of about 2 mm to about 14 mm.

Figure 15B:
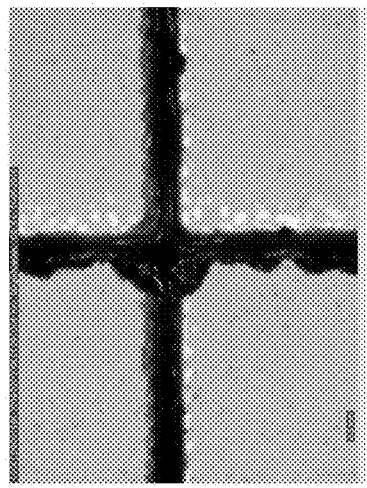
FIGS. 15A and 15B show a comparison of unoptimized (FIG. 15A) vs. optimized (FIG. 15B) printing of four different colors (cyan, magenta, white, and black)
Figure 15A:
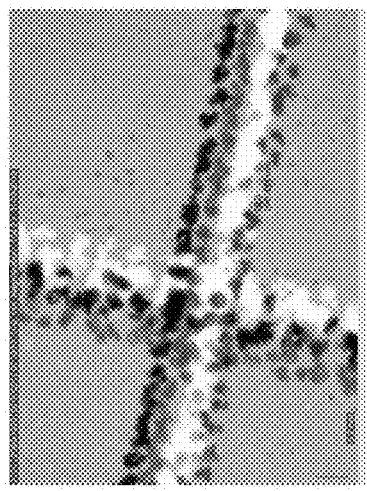

Therefore, combinations of multiple drop sizes above the minimum drop size required for long distance printing can give multiple greyscale modes to run that optimize the drop size distribution based on the artwork to be printed. For example, as shown in FIGS. 15A and 15B, at 11.5 mm distance D from the substrate, the unoptimized ink drops deviate from their print location giving separate color lines (FIG. 15A), instead of all colors coinciding with each other (FIG. 15B) for optimized ink drops. FIG. 15A shows a low-quality image due to ink drop deviation, while FIG. 15B shows an image with all color laying on one line and providing a quality image.

Figures 16A, 16B:
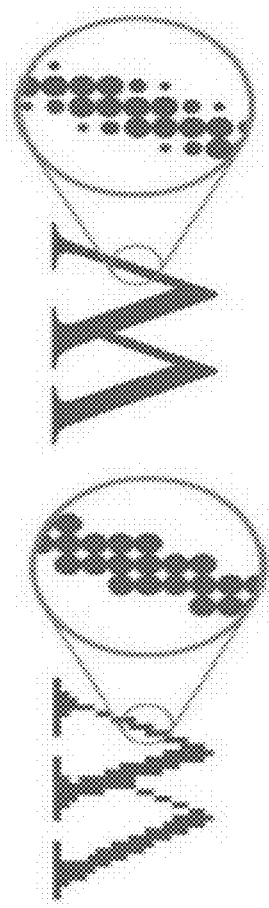
FIGS. 16A and 16B show a comparison of printing using the same drop size (FIG. 16A) and printing using different drop sizes optimized for their locations (FIG. 16B)

Further, for certain images, in addition to varying depth, it is possible to control the drop size (such as by adjusting the waveform) depending on the location of the pixel within the particular image. For example, printing a solid color circle may utilize higher drop sizes in the middle, while the periphery may have variable drop sizes to give a sharp edge and provide a better print image quality. As shown in FIGS. 16A and 16B, the letter W printed with varying dot sizes (FIG. 16B) shows superior quality to the same letter printed with the same dot size (FIG. 16A).

Figure 7:
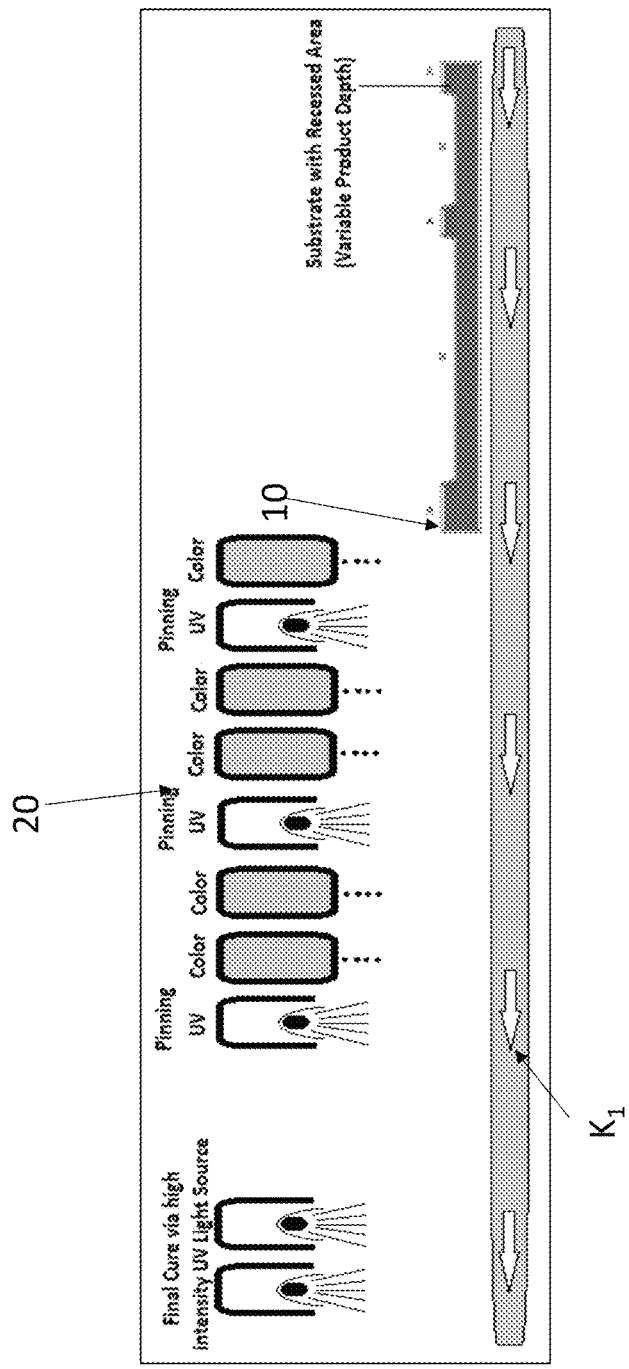
FIGS. 7-9 show various inkjet printer configurations for printing on the door skin according to the exemplary embodiment of the present invention.
Figure 8:
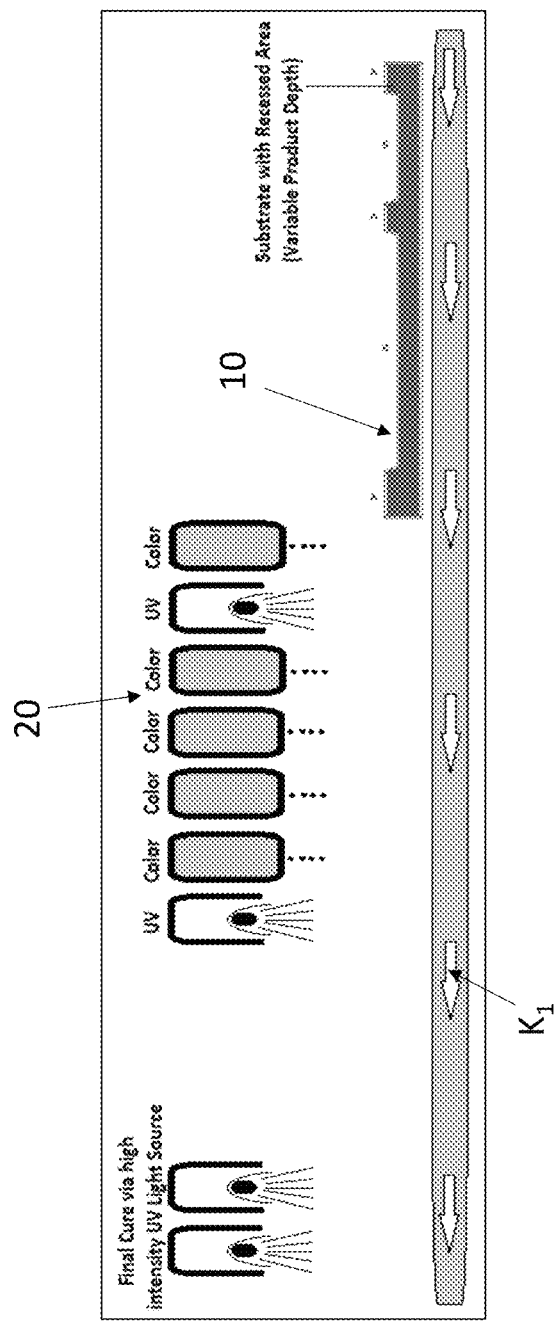
Figure 9:
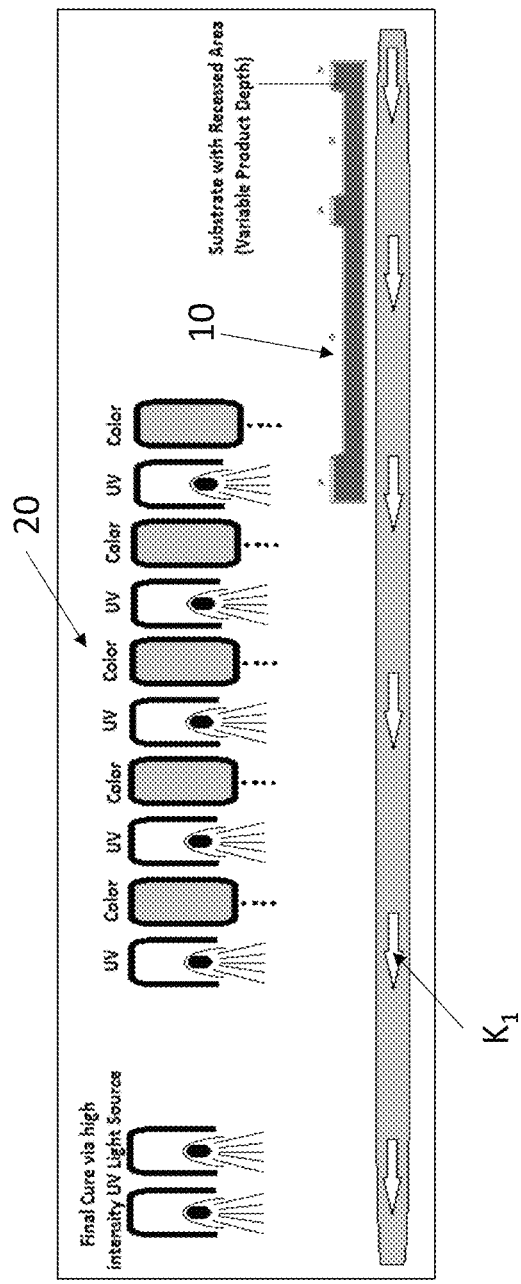

FIGS. 7-9 show various inkjet printer 20 configurations for printing the door skin 10 according to the exemplary embodiment. As illustrated in FIG. 7-9, various inkjet printer 20 configurations achieve quick setting of the ink before final curing to reduce dot gain. As best shown in FIGS. 7-9, UV pinning lights are interposed between inkjet nozzles and radiate ultraviolet (UV) radiation that pins or fixes the drops after they impact the substrate. This pinning prevents the drops from spreading because they are partially cured, and thus their size after impact remains fixed. FIGS. 7-9 also illustrate high intensity UV lights to cure the droplets/images after completion of printing. The high intensity UV lamps are downstream of the inkjet nozzles. The door skin 10 passes underneath the inkjet printer 20 in a single pass, so the high intensity UV lamps are at the end of the pass after all ink has been ejected and the image formed. It should be understood that the inkjet printer 20 configurations illustrated in FIGS. 7-9 are merely examples of the various possible inkjet printer configurations and are not limited to number of colors/specialty inks illustrated in FIG. 7-9. One skilled in the art would understand that the configurations illustrated in FIG. 7-9 are merely examples, and other configurations may be possible for the present invention.

Overall, existing printer/ink combinations are not able to print high quality renditions of designs/images over large variable surface depths of a substrate. By printing with the grain of the wood grain/tick pattern and by providing sufficient drop size and velocity of the drop from the print head, the present invention provides a methodology for providing high quality images over a substrate surface containing various surface depths or features, exceeding the image quality of existing inkjet practice.

Figure 17:
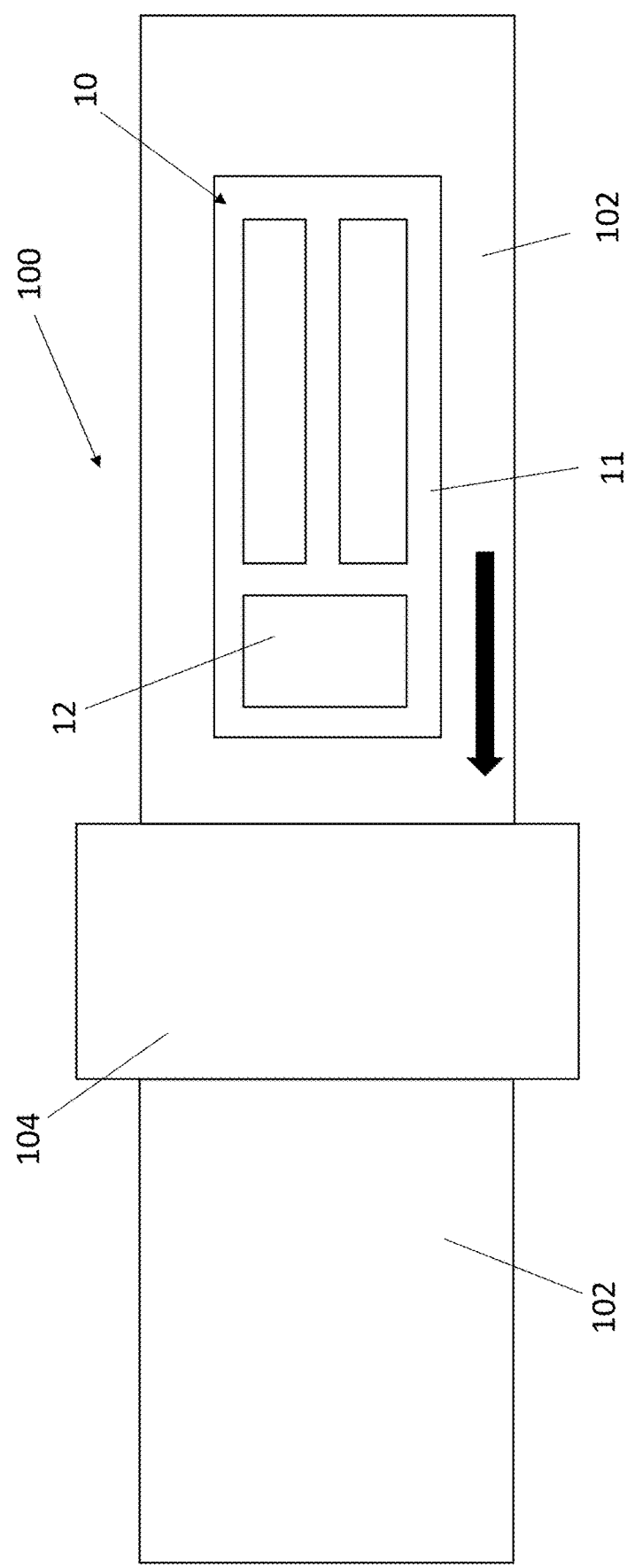
FIG. 17 is a top view of an inkjet printing system for printing patterns on door skins and door components.

FIG. 17 shows a preferred system 100 for inkjet printing onto the exterior surface 11 of the door skin 10. The system 100 includes a stationary printer 104 and a conveyor 102, such as a belt conveyor, for transporting the door skin 10 to and under the printer 104. As the door skin 10, positioned faced up on the conveyor 102, is transported under the printer 104, ink is deposited on the door skin 10 to form an image/pattern on the exterior surface 11 of the door skin 10. The length of the door skin 10 is parallel to the transport direction (arrow) so that the printing direction is parallel to the direction of the woodgrain. Preferably, the conveyor 102 transports the door skin 10 through the printer 104 at a rate of about 1 m/minute to about 20 m/minute, preferably about 5 m/minute. That transport rate is matched with the droplet size to provide a high quality image. Preferably, the printer 104 simultaneously deposits ink across the width of the door skin 10 as the door skin 10 passes under the printer 104. That is accomplished by using multiple print heads in the printer 104, which are positioned to span the width of the door skin 10. An exemplary printer is available from Grouppo TechnoFerrari, Model Vivajet Single Pass Printer. The printer 104 has ultraviolet lamps adjacent to the print heads in order to apply UV light to affix or pin the ink droplets promptly after impinging onto the substrate. The ink is thus prevented from running and the droplets remain where they impacted the substrate.

In certain embodiments, after printing, a protective coating may be applied over the printed image/pattern. The protective coating is preferably transparent so that the image/pattern is visible. The protective coating may be, but is not limited to, polyurethane, epoxy, polyester, acrylic (1K or 2K), or combinations thereof. The protective coating may be water based, organic solvent based, solid, or combinations thereof. The coating may be applied to the substrate with a wide variety of techniques, including, but not limited to, spraying techniques, such as high-pressure and low-pressure systems, powder coating, hydrographics, rolling brushing, dipping, or combinations thereof. Preferably, the application of the protective coating occurs after drying/curing of the ink.

Therefore, the method for inkjet printing of a woodgrain/tick pattern on a door skin according to the present invention exhibits high quality images over various surface depths or features, exceeding the image quality of existing inkjet practice. The method of inkjet printing the woodgrain/tick pattern on the door skin according to the present invention adds the ability to print in the recessed area/variable product depth and shapes/panel profile (contours) of the print receiving substrate (doors, door skins, door system components, furniture, panels, siding, etc.) by printing in the direction of the woodgrain/ticks and controlling variables such as bed speed/substrate speed, ink velocity, drop size, rheology of the ink, etc. Preferably, the drop size is at least 18 picoliters, more preferably from about 18 to about 42 picoliters. For a GS6 printhead, the preferred drop size is about 18 to about 42 picoliters; and for a GS12 printhead, the preferred drop size is about 24 to about 84 picoliters. In preferred embodiments, the nozzles of the printer eject the same drop size onto the substrate whose printing surface varies in distance from the printheads at about 2 mm to about 14 mm. Those skilled in the art will recognize that the printhead to substrate distance D varies not over across the width of the door facing but also across its length due to the ovalo extending completely around the typically rectangular panels 12.

The foregoing description of the exemplary embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A printed door skin, comprising
    a. a paneled door skin having an outer surface comprising a planar peripheral portion extending about the door skin, a panel portion and an ovalo interconnecting the panel portion and the planar peripheral portion, said outer surface having variable depth; and
    b. an inkjet pattern printed onto the outer surface, the ink jet pattern comprises ink drops having a volume of 18 to 42 picoliters, providing a high quality image.

2. The printed door skin of claim 1, wherein the inkjet printed pattern is a woodgrain pattern comprising a plurality of ticks.

3. The printed door skin of claim 2, wherein the pattern is printed in the direction of the wood grain.

4. The printed door skin of claim 1, further comprising a clear coat on the inkjet pattern.

5. The printed door skin of claim 1, wherein the door skin comprises a fiber reinforced polymer.

6. The printed door skin of claim 1, wherein the panel portion is recessed from the peripheral portion.

7. The printed door skin of claim 1, wherein the ovalo portion is curvilinear.

8. The printed door skin of claim 1, wherein the door skin comprises a composite material.

9. The printed door skin of claim 8, wherein the composite material has a thickness of about 0.05 inches to about 0.20 inches.

10. The printed door skin of claim 8, wherein the composite material comprises a sheet molding compound.

11. The printed door skin of claim 10, wherein the sheet molding compound comprises of a thermosetting resin composition and a reinforcement material.

12. The printed door skin of claim 1, wherein the door skin comprises an exterior surface that is embossed with a pattern.

13. The printed door skin of claim 12, where in the pattern is a woodgrain pattern.

14. The printed door skin of claim 6, wherein the height difference between the panel portion and the peripheral portion is about 9 mm or more.

15. The printed door skin of claim 1, wherein the ink drops comprise four to six colors.

16. The printed door skin of claim 15, wherein the colors comprise at least cyan, magenta, white, and black.

17. The printed door skin of claim 1, wherein the ink drops are cured on the door skin.

18. The printed door skin of claim 1, wherein the ink drops are cured by UV light.

19. A printed door skin, comprising
a door skin having a major surface having a planar peripheral portion extending about the door skin, a panel portion at an elevation spaced from the plane of the panel portion, and an interconnecting portion interconnecting the panel portion and the planar peripheral portion, the door skin formed from one of a wood composite and fiberglass reinforced polymer;
an inkjet pattern printed onto the major surface, the inkjet pattern comprises ink drops having a volume of 18 to 42 picoliters providing a high quality image, the inkjet pattern simulating wood grain and tick images, the inkjet pattern printed in a direction corresponding to the direction of the wood grain.

20. The door skin of claim 19, wherein the major surface is embossed with a wood grain pattern.

\* \* \* \* \*